US009319340B2

(12) United States Patent
Pope et al.

(10) Patent No.: US 9,319,340 B2
(45) Date of Patent: Apr. 19, 2016

(54) PROCESSING RECEIVED DATA

(71) Applicant: Solarflare Communications, Inc., Irvine, CA (US)

(72) Inventors: Steven Pope, Cambridges (GB); David Riddoch, Huntingdon (GB)

(73) Assignee: Solarflare Communications, Inc., Irvine, CA (US)

( * ) Notice: Subject to any disclaimer, the term of this patent is extended or adjusted under 35 U.S.C. 154(b) by 0 days.

(21) Appl. No.: 13/633,830

(22) Filed: Oct. 2, 2012

(65) Prior Publication Data
US 2013/0117465 A1 May 9, 2013

Related U.S. Application Data

(63) Continuation of application No. 12/215,437, filed on Jun. 26, 2008, now Pat. No. 8,286,193, which is a continuation of application No. PCT/GB2006/004946, filed on Dec. 28, 2006.

(30) Foreign Application Priority Data

Dec. 28, 2005 (GB) .................................. 0526519.4

(51) Int. Cl.
H04L 12/863 (2013.01)
G06F 9/455 (2006.01)
G06F 9/54 (2006.01)
H04L 29/06 (2006.01)

(52) U.S. Cl.
CPC ............ *H04L 47/62* (2013.01); *G06F 9/45533* (2013.01); *G06F 9/544* (2013.01); *H04L 29/06* (2013.01)

(58) Field of Classification Search
USPC ........................................... 719/319; 709/236
See application file for complete search history.

(56) References Cited

U.S. PATENT DOCUMENTS

| 6,631,434 | B1 * | 10/2003 | Johnson et al. ................ 710/260 |
| 7,680,964 | B2 * | 3/2010 | Schmidt .......................... 710/36 |
| 7,738,500 | B1 * | 6/2010 | Jones et al. .................... 370/503 |
| 7,809,357 | B2 * | 10/2010 | Hall et al. .................... 455/412.2 |
| 8,296,417 | B1 * | 10/2012 | Gershon et al. ............... 709/224 |
| 2002/0150048 | A1 * | 10/2002 | Ha et al. ........................ 370/231 |
| 2004/0236880 | A1 * | 11/2004 | Barrett .......................... 710/52 |
| 2005/0117583 | A1 * | 6/2005 | Uchida et al. .............. 370/395.4 |
| 2007/0008884 | A1 * | 1/2007 | Tang .............................. 370/230 |
| 2010/0057932 | A1 * | 3/2010 | Pope et al. .................... 709/236 |

OTHER PUBLICATIONS

Kozierok, The TCP/IP Guide—TCP Window Size Adjustment and Row Flow Control, 2005, 9 pages.*

* cited by examiner

Primary Examiner — Diem Cao
(74) Attorney, Agent, or Firm — Weide & Miller, Ltd.

(57) ABSTRACT

A method for controlling the processing of data in a data processor such that the data processor is connectable to a further device over a data link. The method comprising the steps of receiving data at an element of the data processor and if a set interval has elapsed following the receipt of the data, determining whether processing of the received data in accordance with a data transfer protocol has begun, and, if it has not, triggering such processing of the received data by a protocol processing element. The method then senses conditions pertaining to the data link and sets the interval in dependence on the sensed conditions.

20 Claims, 3 Drawing Sheets

PROCESSING RECEIVED DATA

PRIORITY CLAIM

This application is a continuation of and claims priority to U.S. patent application Ser. No. 12/215,437 filed Jun. 26, 2008 which claims priority to PCT Application No. PCT/GB2006/004946 filed on Dec. 28, 2006, which claims priority to Great Britain Application No. 0526519.4 filed on Dec. 28, 2005.

FIELD OF THE INVENTION

This invention relates to a method and apparatus for controlling the processing of data in a data processor.

BACKGROUND OF THE INVENTION

In data networks it is important to enable efficient and reliable transfer of data between devices. Data can only reliably be transferred over a connection between two devices at the rate that a bottleneck in the connection can deal with. For example, a switch in a TCP/IP configured connection may be able to pass data at a speed of 10 Mbps while other elements of the connection can pass data at, say, 100 Mbps. The lowest data rate determines the maximum overall rate for the connection which, in this example, would be 10 Mbps. If data is transmitted between two devices at a higher speed, packets will be dropped and will subsequently need to be retransmitted. If more than one link is combined over a connector such as a switch, then the buffering capacity of the connector needs to be taken into account in determining maximum rates for the links, otherwise data loss could occur at the connector.

FIG. 1 shows the architecture of a typical networked computing unit 1. Block 6 indicates the hardware domain of the computing unit. In the hardware domain the unit includes a processor 2 which is connected to a program store 4 and a working memory 5. The program store stores program code for execution by the processor 2 and could, for example, be a hard disc. The working memory could, for example, be a random access memory (RAM) chip. The processor is connected via a network interface card (NIC) 2 to a network 10. Although the NIC is conventionally termed a card, it need not be in the form of a card: it could for instance be in the form of an integrated circuit or it could be incorporated into the hardware that embodies the processor 2. In the software domain the computing unit implements an operating system 8 which supports an application 9. The operating system and the application are implemented by the execution by the processor 3 of program code such as that stored in the program store 4.

When the computing unit receives data over the network, that data may have to be passed to the application. Conventionally the data does not pass directly to the application. One reason for this is that it may be desired that the operating system polices interactions between the application and the hardware. As a result, the application may be required to interface with the hardware via the operating system. Another reason is that data may arrive from the network at any time, but the application cannot be assumed always to be receptive to data from the network. The application could, for example, be de-scheduled or could be engaged on another task when the data arrives. It is therefore necessary to provide an input mechanism (conventionally an input/output (I/O) mechanism) whereby the application can access received data.

FIG. 2 shows an architecture employing a standard kernel TCP transport (TCPk). The operation of this architecture is as follows.

On packet reception from the network, interface hardware 101 (e.g. a NIC) transfers data into a pre-allocated data buffer (a) and invokes an interrupt handler in the operating system (OS) 100 by means of an interrupt line (step i). The interrupt handler manages the hardware interface. For example, it can indicate available buffers for receiving data by means of post( ) system calls, and it can pass the received packet (for example an Ethernet packet) and identify protocol information. If a packet is identified as destined for a valid protocol e.g. TCP/IP it is passed (not copied) to the appropriate receive protocol processing block (step ii).

TCP receive-side processing then takes place and the destination port is identified from the packet. If the packet contains valid data for the port then the packet is engaged on the port's data queue (step iii) and the port is marked as holding valid data. Marking could be performed by means of a scheduler in the OS 100, and it could involve awakening a blocked process such that the process will then respond to the presence of the data.

In some circumstances the TCP receive processing may require other packets to be transmitted (step iv), for example where previously transmitted data needs to be retransmitted or where previously enqueued data can now be transmitted, perhaps because the TCP transmit window (discussed below) has increased. In these cases packets are enqueued with the OS Network Driver Interface Specification ("NDIS") driver 103 for transmission.

In order for an application to retrieve data from a data buffer it must invoke the OS Application Program Interface (API) 104 (step v), for example by means of a call such as recv( ), select( ) or poll( ). These calls enable the application to check whether data for that application has been received over the network. A recv( ) call initially causes copying of the data from the kernel buffer to the application's buffer. The copying enables the kernel of the OS to reuse the buffers which it has allocated for storing network data, and which have special attributes such as being DMA accessible. The copying can also mean that the application does not necessarily have to handle data in units provided by the network, or that the application needs to know a priori the final destination of the data, or that the application must pre-allocate buffers which can then be used for data reception.

It should be noted that on the receive side there are at least two distinct threads of control which interact asynchronously: the up-call from the interrupt and the system call from the application (described in co-pending application WO2005/074611). Many operating systems will also split the up-call to avoid executing too much code at interrupt priority, for example by means of "soft interrupt" or "deferred procedure call" techniques.

The send process behaves similarly except that there is usually one path of execution. The application calls the operating system API 104 (e.g. using a send( ) call) with data to be transmitted (step vi). This call copies data into a kernel data buffer and invokes TCP send processing. Here protocol is applied and fully formed TCP/IP packets are enqueued with the interface driver 103 for transmission.

If successful, the system call returns with an indication of the data scheduled (by the hardware 101) for transmission. However there are a number of circumstances where data does not become enqueued by the network interface device. For example the transport protocol may queue pending acknowledgements from the device to which it is transmitting, or pending window updates (discussed below), and the device driver 103 may queue in software pending data transmission requests to the hardware 101.

A third flow of control through the system is generated by actions which must be performed on the passing of time. One example is the triggering of retransmission algorithms. Generally the operating system 100 provides all OS modules with time and scheduling services (typically driven by interrupts triggered by the hardware clock 102), which enable the TCP stack to implement timers on a per-connection basis. Such a hardware timer is generally required in a user-level architecture, since then data can be received at a NIC without any thread of an application being aware of that data. In addition to a hardware timer of this type, timers can be provided (typically in software) to ensure that protocol processing advances.

The setting of a software timer for ensuring the advance of protocol processing can impact on the efficiency of data transfer over the network. The timer can for example be instructed by a transport protocol library of the application to start counting when a new packet is delivered from the NIC to the transport protocol library. On expiry of a timeout, the timer causes an event to be delivered to an event queue in the kernel, for example by issuing an event from the NIC 101, the event identifying an event queue in the OS. At the same time as the event is delivered, an interrupt is scheduled to be delivered to the OS. According to the interrupt moderation rules in force, an interrupt is raised and the OS will start to execute device driver code to process events in the event queue. Thus, the software timer can be arranged to trigger protocol processing of data received at the data processor over the network, or to trigger protocol processing of data for transmission over the network. Such a timer preferably causes the kernel to be invoked relatively soon (for example within 250 ms) after the receipt of data at the NIC.

FIG. 3a illustrates a conventional synchronous I/O mechanism. An application 32 running on an OS 33 is supported by a socket 50 and a transport library 36. The transport library has a receive buffer 51 allocated to it. The buffer could be an area of memory in the memory 5 shown in FIG. 1. When data is received by the NIC 31 it writes that data to the buffer 51. When the application 32 wants to receive the data it issues a receive command (recv) to the transport library via the socket 50. In response, the transport library transmits to the application a message that includes the contents of the buffer. This involves copying the contents of the buffer into the message and storing the copied contents in a buffer 52 of the application. In response to obtaining this data, the application may cause messages to be issued, such as an acknowledgement to the device which transmitted the data. A problem with this I/O mechanism is that if the application fails to service the buffer often enough then the buffer 51 can become full, as a consequence of which no more data can be received.

FIG. 3b illustrates a conventional asynchronous I/O mechanism. This mechanism avoids the overhead of copying the data by transferring ownership of buffers between the transport library and the application. Before data is to be received, the application 32 has a set of buffers ($B_1$-$B_3$) allocated to it. It then passes ownership of those buffers to the transport library 36 by transmitting to the transport library one or more post( ) commands that specify those buffers. When data is received it is written into those buffers. When the application wants to access the data it takes ownership of one or more of the buffers back from the transport library. This can be done using a gather( ) command that specifies the buffers whose ownership is to be taken back. The application can then access those buffers directly to read the data. A problem with this I/O arrangement is that the amount of data that is collected when the gather( ) command is executed could be very large, if a large amount of buffer space has been allocated to the transport library, and as a result the application may need considerable time to process that data.

Thus, with both of these mechanisms problems can arise if the application services the buffers at too fast or too slow a rate. If the buffers are serviced too infrequently then they can become full (in which case the reception of data must be suspended) or the amount of data that is returned to the application when the buffers are serviced could be very large. However, if the buffers are serviced too frequently then there will be excessive communication overheads between the application and the transport library as messages are sent between the two. One way of addressing these problems is to arrange for the transport library to set a timer that, on reaching a timeout, triggers the operating system to assist in processing any received data. This is particularly useful in the case of a user-level network architecture, where the transport library is normally driven by synchronous I/O calls from the application. The timer could, for example, run on the NIC. This mechanism can improve throughput but it has the disadvantage that it involves interrupts being set to activate the operating system to process the data. Processing interrupts involves overhead, and there may also only be a limited number of interrupts available in the system.

There is therefore a need for a mechanism which can increase the efficiency with which data can be protocol processed.

SUMMARY

According to the present invention there is provided a method for controlling the processing of data in a data processor, the data processor being connectable to a further device over a data link, the method comprising the steps of: receiving data at an element of the data processor; if a set interval has elapsed following the receipt of the data, determining whether processing of the received data in accordance with a data transfer protocol has begun, and, if it has not, triggering such processing of the received data by a protocol processing element; sensing conditions pertaining to the data link; and setting the interval in dependence on the sensed conditions.

The data processor may be connectable to the data link by means of an interface. A timer could reside on the interface, and the said interval could suitably be measured by the timer. The interface could suitably be implemented in hardware.

The step of determining may comprise determining whether processing of the received data by code at user level has begun.

The said protocol processing element is preferably an operating system.

The received data could comprise data received at the data processor over the data link, optionally by means of an asynchronous transmission.

The received data could also comprise data to be transmitted over the data link, optionally by means of an asynchronous transmission over the data link.

The step of triggering processing may comprise issuing an interrupt, preferably to the operating system.

The said element could be a transport library associated with an application running on the data processor.

The method could further comprise the step of in response to receiving the data, sending an instruction from the said element to the timer. The step of sending an instruction to the timer could comprise triggering the timer directly from the said element via a memory mapping onto the said interface.

The step of setting the interval may comprise reducing the interval if the sensed conditions are indicative of an increase in data rate over the data link.

Buffer space could be allocated to the data link for storing data received at the data processor over the data link, and the protocol could be a protocol that employs a receive window in accordance with which a transmitter of data according to the protocol will transmit no further traffic data once the amount of data defined by the receive window has been transmitted and is unacknowledged by the receiver, and the step of setting the interval could comprise reducing the interval in response to sensing that the size of the buffer space allocated to the data link is greater than the size of the receive window. The method could also comprise the step of varying the size of the buffer space allocated to the data link in response to a request from a consumer of the traffic data. The consumer could be an application running on the data processor.

The step of sensing conditions could comprise sensing the presence in a transmit buffer of data to be transmitted over the data link.

The step of setting the interval could comprise reducing the interval in response to sensing in a transmit buffer data to be transmitted over the data link.

The step of setting the interval could comprise reducing the interval in response to sensing that a congestion mode of the protocol is in operation over the data link.

The protocol could suitably be TCP.

According to a second aspect of the present invention there is provided apparatus for controlling the processing of data in a data processor, the data processor being connectable to a further device over a data link, the apparatus comprising: an element arranged to receive data; and a control entity arranged to, if a set interval has elapsed following the receipt of data, determine whether processing of the received data in accordance with a data transfer protocol has begun, and, if it has not, trigger such processing of the received data by a protocol processing element; wherein the control entity is further arranged to sense conditions pertaining to the data link and set the interval in depend dependence on the sensed conditions.

According to a third aspect of the present invention there is provided a control entity for use with a data processor, the data processor being connectable to a further device over a data link, and comprising an element arranged to receive data, the control entity being arranged to: if a set interval has elapsed following the receipt of data by the said element, determine whether processing of the received data in accordance with a data transfer protocol has begun, and, if it has not, trigger such processing of the received data by a protocol processing element; and sense conditions pertaining to the data link and set the interval in dependence on the sensed conditions.

The present invention will now be described by way of example with reference to the accompanying drawings.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
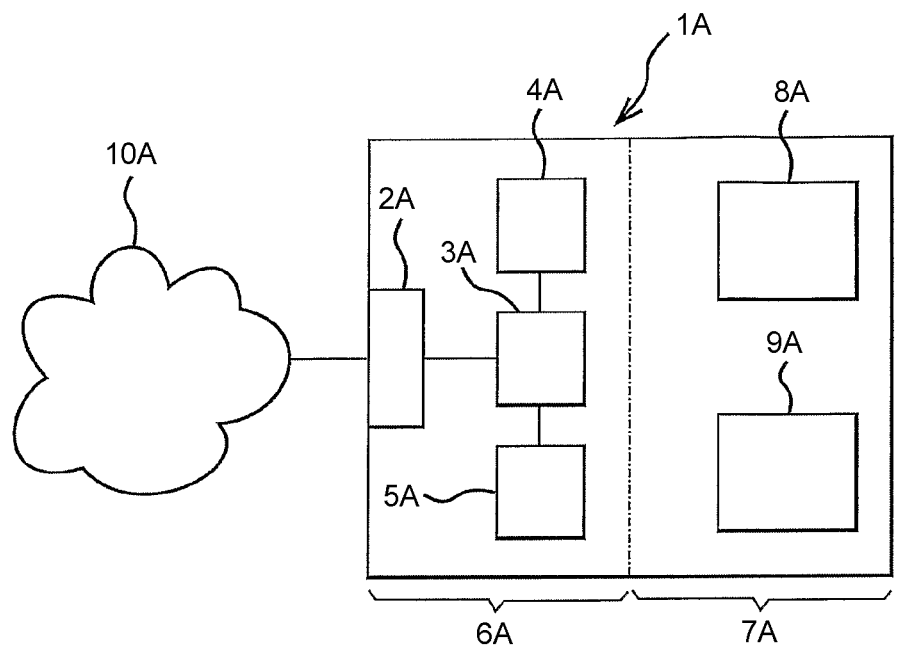
FIG. 1 shows the architecture of a computing system.

In the present system the entity that is to process received data, which could for example be an application or part of the operating system, is capable of varying the minimum threshold frequency with which it services the receive buffer(s) in dependence on conditions that may be taken as indicative of changes in the rate at which data is being received. In this way the entity can service the buffers more quickly when data is expected to be received in greater volume, and more slowly when little data is expected to be received.

TCP is a common example of a transport protocol, and a discussion of the TCP windows technique will now be given. According to the TCP protocol, each time a certain amount of data is transmitted from one device to another over a network, the transmitting device must await an acknowledgement from the receiving device before sending further data. A TCP window is the amount of unacknowledged data a sender can send on a particular connection before it must await an acknowledgement from the receiver. To give a simple example, the window could be specified as 10 octets (or bytes). Thus, once 10 bytes have been sent by a sender, no further transmission will be permitted until the sender receives an acknowledgement from the receiver that at least some of those 10 bytes have been received. If the acknowledgement indicates, for example, that all 10 bytes have been safely received then the sender is able to transmit a further 10 bytes. If the acknowledgement indicates that only the first 2 bytes have been received then the sender may transmit 2 further bytes and must then await further acknowledgement.

The TCP window mechanism provides congestion control for a network. The window is generally fixed for a connection according to the properties of the bottleneck in the connection at a given time to ensure that data cannot be sent at a greater rate than the bottleneck can handle without losing data.

A receiver in a network advertises a receive window to devices with which it has network connections, so that the devices can configure themselves accordingly. The sender's send window will be set equal to the receiver's receive window for a particular connection. As an example, the size of the receive window (in bytes) could simply be the size of the buffer space on a receiving device's network interface minus the amount of data currently stored in the buffer.

Window announcements from a receiver can include an acknowledgement of previously sent data. This is an efficient arrangement since it can enable two items of information to be sent in one message.

It is commonly desirable for transmission and reception over a network to be in a steady-state condition whereby packets are periodically sent from a sender and acknowledgements (which may be accompanied by window announcements) are periodically sent from a receiver. This is an efficient mode of data transfer since data packets can be continually in transit over the network.

The window size for a particular network connection can be varied in response to changes within the connection; for example, it could be increased if more buffer space becomes available at the receiver. Changes in window size are indicated to a sender by means of window announcements.

Figure 4:
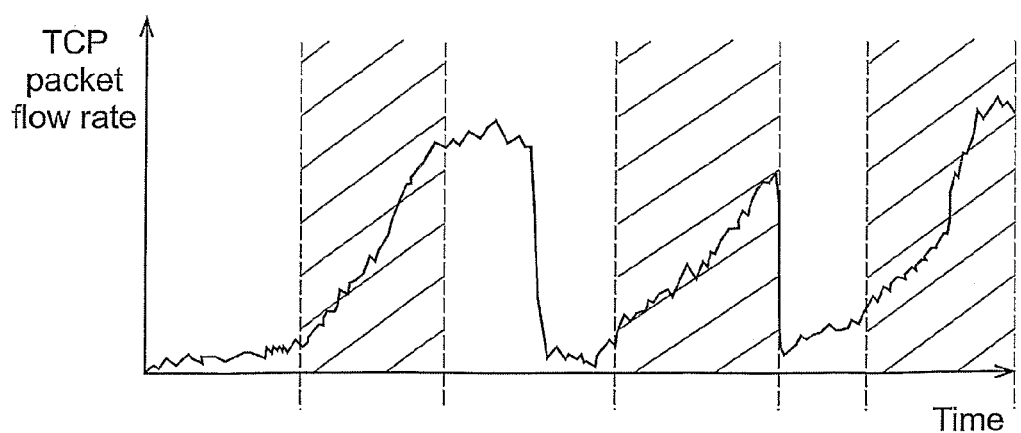
FIG. 4 illustrates a typical flow of data transmitted in accordance with the TCP protocol.

The flow rate of data according to the TCP protocol may be ramped, as illustrated in FIG. 4. In general, the receive window will initially be defined to be relatively small. If a transmitting application has a large amount of data to be sent, evidenced by the fact that the receiver is receiving data at the maximum rate permitted by the window/acknowledgement technique, in other words if the connection is "busy", then the receiver may wish to permit a greater rate of transmission over the connection by increasing its receive window. Typically, the window will be increased in a stepwise manner for as long as the transmitter continues to transmit at the maximum rate and until packet drop is detected. When packet drop is detected, the window will be decreased (typically halved) in order to avoid further loss of data, and this will be advertised in the next window announcement sent by the receiver. In the exemplary flow shown in FIG. 4, the shaded regions are where flow rate is increasing and thus fast window increase is desirable so that the transfer rate can be increased accordingly.

It was noted above that the TCP window may be halved suddenly when packet drop is detected. Packet drop may be detected as an absence of an acknowledgement from the receiving device at the transmitting device. Typically, after a predetermined time interval, if no acknowledgement is received at the transmitter then the transmitter will commence retransmission of the packets which have not yet been acknowledged. The absence of an acknowledgement may be due to data actually having been lost over the network connection, or it may be due to a delay in the connection such that the data has not been received at the receiver within the predetermined time interval, causing the transmitter to timeout and commence retransmission.

Considering transmission from a transmitting device, if a send queue associated with a transmitting application is not permitted adequate CPU time then protocol processing of data waiting in the queue cannot occur sufficiently fast for the send queue to be emptied and the data to be sent to the network interface for transmission over the network. If data is awaiting processing and no data is ready to be sent then it is possible that the connection may go idle. Additionally, send queues may become full such that they cannot accept new data. Similarly, for a receiving device it is important that incoming data can be processed at the rate at which it is being received. Regular and timely processing of buffered incoming data is therefore important. In general, timely protocol processing of waiting data is desirable to achieve efficient data transfer over a data link. This is especially true for asynchronous transmission, since large chunks of data tend to be delivered, whereas in synchronous transmission the chunks tend to be smaller.

Additionally, the overall transfer rate of data can be improved by enabling an increasing window to reach its maximum size as quickly as possible. This can be achieved by dedicating more CPU time to flows which are accelerating than to flows which are constant or increasing.

Figure 2:
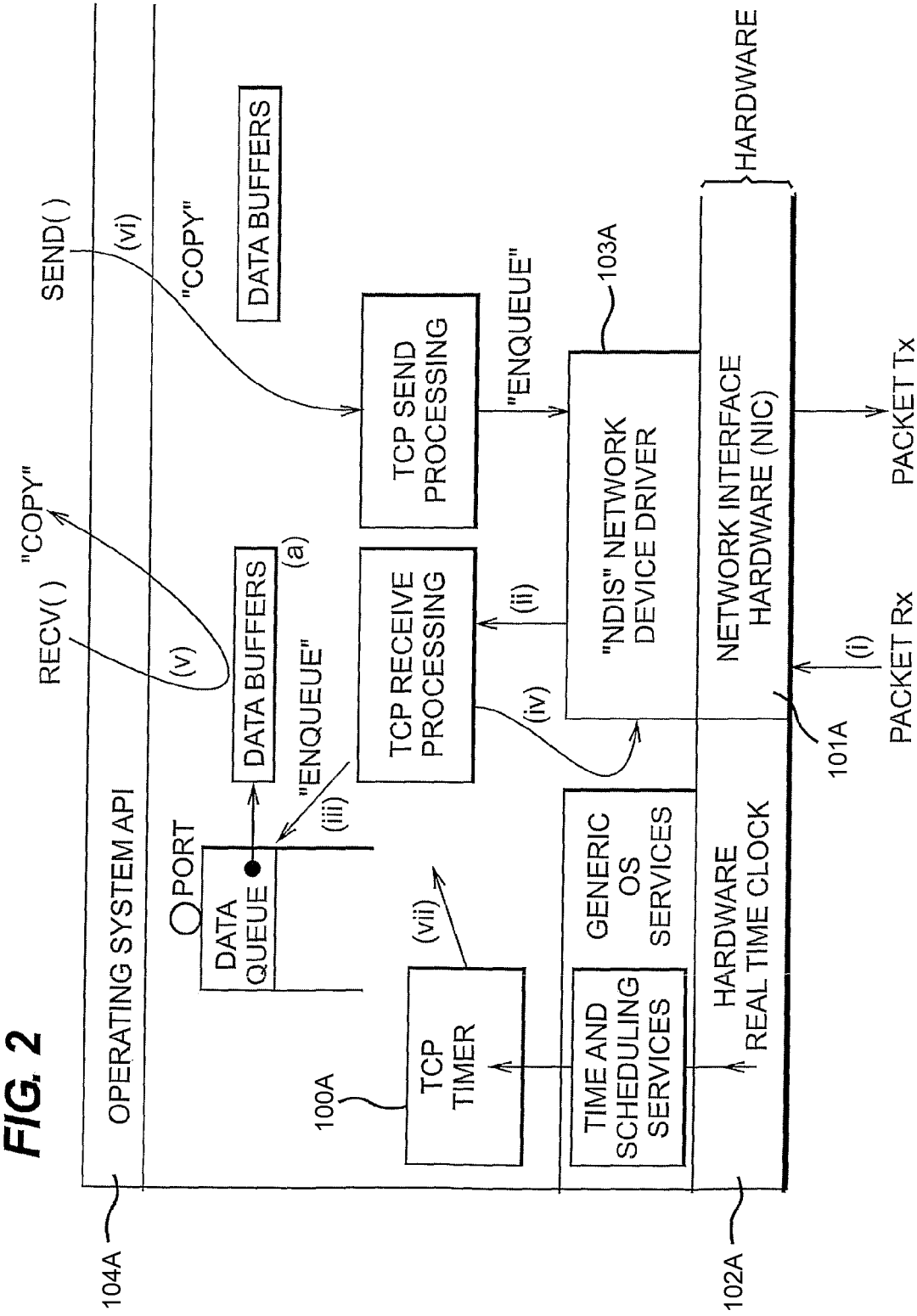
FIG. 2 is a schematic representation of a prior art data transfer architecture.
Figure 3A:
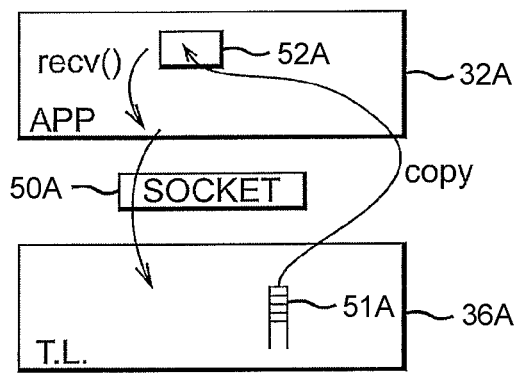
FIG. 3a shows a data processing system arranged for synchronous data transfer.
Figure 3B:
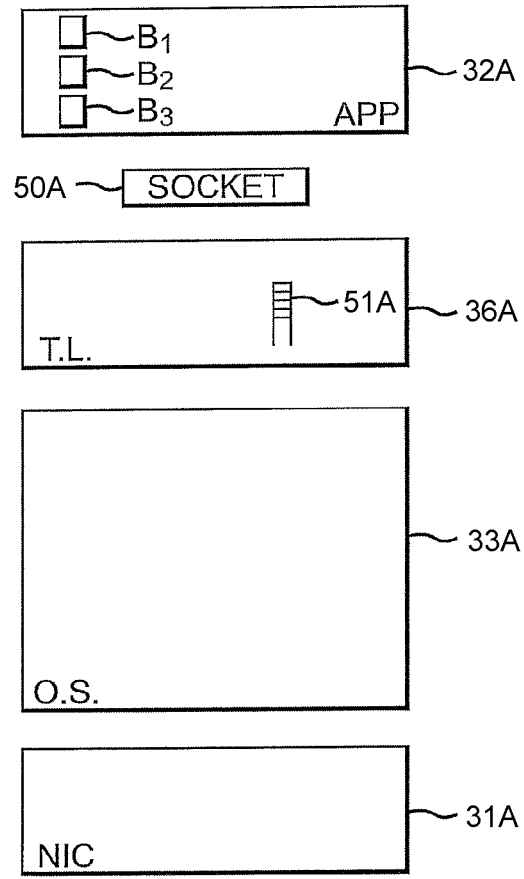
FIG. 3b shows a data processing system arranged for asynchronous data transfer.

In the discussion of FIG. 2 above, it was noted that timers may be used to ensure that queues of data are permitted regular attention. In respect of issuing interrupts following timeouts, the inventors of the present invention have appreciated that a long timeout can reduce CPU overhead since it can reduce the number of spurious interrupts. However, a long timeout can be inappropriate in asynchronous transmission mode since it can cause protocol processing to proceed at too slow a rate.

The provision of timeouts for ensuring protocol processing is particularly important in a system incorporating a user-level protocol stack, such as that described in co-pending PCT application number PCT/GB05/001525. In such a system protocol processing (such as TCP processing) generally takes place within the context of an application thread. If the transport library is not given sufficient CPU time (for example because the thread is performing another operation or is descheduled) then by means of a timeout and an interrupt a component of the OS can be engaged to carry out the required protocol processing on behalf of the user-level stack. The question of how to determine an optimal length for a timeout is thus relevant in this environment. It is therefore proposed by the inventors to provide a means of adjusting timeouts dynamically according at least to the behaviour of an application to or from which data is being sent over the network.

In one instance, it may be desirable to provide a timer at a transmitting device, and to cause the timer to start each time data is delivered to an element of the device at which protocol processing must be performed to enable subsequent transmission of the data over the network. When the timer times out, the operating system or user-level code could be triggered to perform protocol processing of the delivered data. This could ensure that data could flow at an acceptable rate from the transmitting device over the network.

In another instance, it may be desirable to provide a timer at a receiving device, and to cause the timer to start each time data is delivered from the network to an element of the device at which protocol processing must be performed for the data to be made available to a consumer, such as an application running on the receiving device. In this instance, when the timer times out, the operating system or user-level code could be triggered to perform protocol processing of the received data. This could ensure that incoming data could be processed at the rate at which it is being received over the network.

The element of the transmitting device could be a transport library or any buffer in which data is stored pending processing to prepare the data for transmission by a network protocol. The element of the receiving device could be a transport library or any buffer in which data is stored following receipt over a network pending processing to enable the data to be read by a consumer.

When the rate of data transmission over a network is ramping up it is desirable to ramp up the size of the TCP window as fast as possible in accordance with the TCP algorithms to keep pace with the amount of data that needs to be sent so that data does not back up at the transmitter. This can be achieved by reducing the timeout on the timer in the transmitting device so that data can be sent at the maximum rate (as defined by the current size of the window), thus triggering window announcements as frequently as possible. More generally, it is desirable to respond as quickly as possible to changes in flow rate.

It will be understood that embodiments of the invention can successfully be applied to both synchronous and asynchronous arrangements.

In general, embodiments of the invention support an algorithm for determining an appropriate timeout length for the present conditions in the connection. The conditions could include the presence or recent occurrence of congestion, the amount of data which an application wishes to send or receive, the amount of other activity in the network, or any other aspect of the network which is relevant to the flow of data over a connection.

Depending on the detected conditions, it could be appropriate to modify the length of the timeout at the receiver or at the transmitter, or at both. The timer could suitably be implemented in hardware, for example at a network interface, or it could be implemented in software. The timer could suitably be arranged to receive instructions to start timing from an element of a data processor at which protocol processing is required. The element could suitably be a transport library.

In one embodiment, a mechanism can be implemented whereby events issued by a transport library can be batched together such that only one interrupt is raised for multiple events. This can avoid a high overhead on the CPU.

Figure 5:
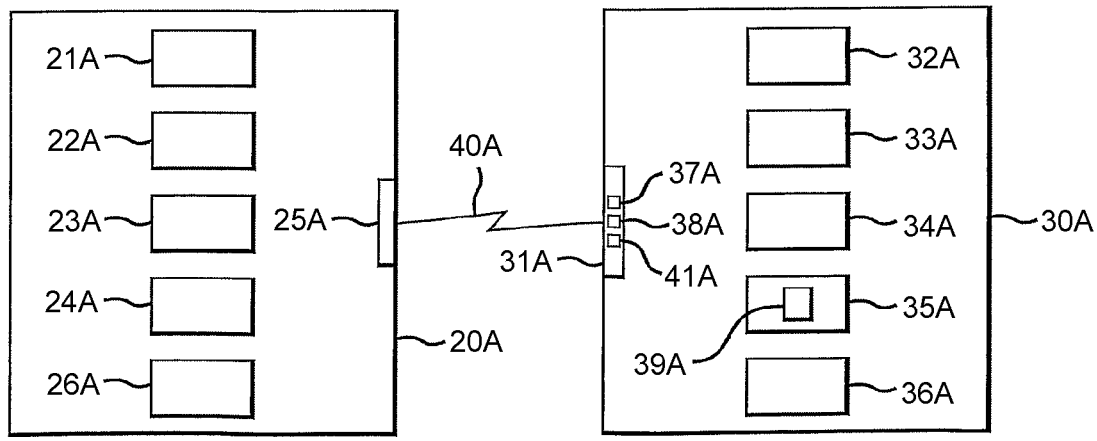
FIG. 5 shows schematically a pair of data processing devices communicating over a data link.

FIG. 5 illustrates a pair of data processing devices communicating over a data link. In the present example device 20 is transmitting data and the other device 30 is receiving that data. However, the devices could communicate bi-directionally. The devices could be in direct communication or could communicate indirectly over a network (e.g. via one or more routers).

In this example the protocol in use by the devices is TCP (transmission control protocol) over Ethernet, but the present invention is suitable for use with other protocols.

Device 20 comprises a data store 21 that stores the data that is to be transmitted. Under the control of an application 22 supported by an operating system 23 and running on a processing unit 24 data from the data store 21 is passed to a NIC 25 for transmission to device 30. Once data has been passed to the NIC for transmission it waits in a send queue. When the NIC is able to transmit more data it takes data from the send queue, encapsulates it in accordance with the protocols that are in use, and transmits it. The send queue may be embodied by a dedicated buffer for outgoing data, or it may be embodied by the storing by the NIC of the addresses of other buffers from which it is to retrieve data for transmission. The NIC 25 performs protocol processing either alone or in conjunction with a transport library 26 running on the processing unit 24.

Device 30 comprises a NIC 31 that is connected to a data link 40 by which it can receive data from NIC 25. The data is destined for an application 32 that is supported by an operating system 33 and runs on a processing unit 34. The device further includes a data store 35 for storing received data, in which one or more buffers can be defined, and a transport library 36 which comprises a set of processes that run on the processing unit and can have state associated with them for performing certain networking functions and for assisting in interfacing between the NIC and the application. Co-pending applications PCT/IB05/002639 and WO2005/086448 describe examples of such a transport library having such functions. The NIC 31 performs protocol processing either alone or in conjunction with the transport library 36.

The protocol processing functions that are carried out by the transmitter and the receiver include implementing flow and congestion control. As is well known, TCP provides a number of flow and congestion control functions. One function involves the TCP receive window described above.

When the application 32 is to receive data it requests from the operating system 33 that buffer space is allocated to it for storing that data in the period between it having been received at the NIC 25 and it being accepted by the application for processing. The buffer can be allocated by the operating system 33 or by the transport library 36. Typically the application will maintain a certain amount of receive buffer space for normal usage. However, a well-designed application will, if it requests a substantial amount of data over the network or learns that it is about to be sent a substantial amount of data over the network, request additional receive buffer space to accommodate that data.

In this context there are numerous situations that are indicative of a potential or ongoing change in the volume data flow over the link between the devices 20 and 30. These include, but are not limited to:

A sudden increase or decrease in the receive buffer allocated to a particular application, or in total to all the applications running on the receiving device. This could indicate a change in flow because, as explained above, a well-designed application will be expected to modify its allocated buffer space in anticipation of receiving more or less data. It should be noted that the amount of allocated buffer space therefore provides an indirect means of signalling between the application layer and lower layers of the protocol stack. Such an increase could be defined by an increase or decrease in allocated receive buffer space of more than a predetermined amount or more than a predetermined proportion over a predetermined time. Alternatively, such an increase could be indicated by the relative sizes of the TCP receive window for a link and the posted receive buffer size for the application to which that link relates. For example, such an increase could be deemed to have taken place when the posted receive buffer size exceeds the TCP receive window.

That the send queue of the transmitter for a particular link is not empty, or has remained not empty for greater than a predetermined period of time. This may be indicative of congestion on the data link between the transmitter and the receiver. However, it may also be indicative of data having been received at the receiver and not having been protocol processed so that an acknowledgement for that data can be sent to the transmitter.

That TCP congestion mode is operating: i.e. that the TCP receive window is reducing (backing off), or subsequently increasing.

Analogous situations will arise under protocols other than TCP and can be sensed in an analogous way. For example, any distributed transport protocol such as SCTP has algorithms similar to the TCP receive window algorithm. The sliding window mechanism is commonly used. Other protocols (often used in conjunction with hardware) such as Infiniband and some ATM link-layer schemes expose credits to the system. The thresholds or rate of change of such credits can be used as indicators of a change in flow rate.

In the present system the NIC 31 implements one or more timers such as timer 37. These timers consist of a counter that is decremented periodically when clocked by a clock 38. The clock could run on the NIC, or the NIC itself could be clocked from the remainder of the data processing device to which it is attached. An initial value is loaded into the timer. When the timer reaches zero the NIC performs an action stored in its state memory 41 in relation to that timer.

One use of such timers is for allowing the NIC 31 to signal the operating system 36 to process data that is waiting in a receive buffer. This will now be described in more detail.

When the device 30 is being configured for reception of data by an application running on it, the application will request one or more areas in memory 35 to be allocated to it for use as receive buffers 39. It then signals the NIC to inform it that the link is to be established and to inform it which receiver buffer(s) are to be used with that link. The buffer allocation and the signalling may be done via the operating system 33 and/or the transport library 36.

When data is received over the network by NIC 31, the NIC identifies which data link that data relates to. This may be indicated by the port number on which the data was received and/or by the source address of the data. The NIC then stores the data in a receive buffer corresponding to that data link.

Since the traffic data components of the received data cannot be identified until protocol processing has been done, the received traffic data cannot be passed to the receiving application until protocol processing has been completed. It is preferred that at least some of the protocol processing that is to be performed on the received data is performed downstream of the NIC, for example by the operating system or the transport library of the receiving device 30. This has been found to permit many potential performance enhancements. The protocol processing that is performed downstream of the NIC can conveniently include the generation of or the triggering of acknowledgement messages for received data. A mechanism whereby this can be done will be described below.

When data has been received by the NIC and written to a receive buffer the operating system or the transport library is to perform protocol processing on that data. Either of these may be instructed by the receiving application to perform the protocol processing. Alternatively either of them may be triggered by a timer that runs separately from the application. Having such a timer running separately from the application is advantageous because it allows the timer to continue to run even if the application becomes de-scheduled. It is preferred that the timer is a timer such as timer 37 running on the NIC. Such a timer can be configured (e.g. by the application or the transport library) when the data link is set up. Conveniently, the transport library signals the NIC during establishment of the link to have the NIC allocate one of its timers for use with the link. To do this the transport library informs the NIC of the initial value of the timer and the function that is to be performed when the timer reaches zero. The initial value is stored by the NIC in memory 41, and the NIC is arranged to automatically reset the timer to the value stored in that field when it has reached zero. The function may be to instruct the operating system to perform protocol processing for any data received for that link and for which protocol processing has not yet been performed. The function is also stored in association with the respective timer in memory 41 so that it can be recalled and actioned by the NIC when the timer reaches zero. Once the timer has been set up it will continually decrement, and then trigger (for example) the operating system to perform protocol processing each time it reaches zero.

In the present system at least one of the entities implements an algorithm that manages the interval over which the timer 37 operates. The interval is altered in dependence on sensed conditions, particularly communication conditions in the transmitter and/or the receiver for the link with which the timer is associated. Most preferably, the interval over which the timer operates is reduced when the entity in question senses conditions that are indicative of an increase in data rate. Most preferably, the interval over which the timer operates is increased when the entity in question senses conditions that are indicative of a decrease in data rate. Some specific examples are as follows.

The interval can be reduced in response to an increase or decrease in the receive buffer allocated to a particular application, or in total to all the applications running on the receiving device. This may be detected in the conditions described above, and most preferably when the posted receive buffer size for the link in question exceeds the size of the TCP receive window for that link. In the opposite conditions the interval can be increased.

The interval can be reduced if the transmitter's send queue for the link in question is not empty, or has remained non-empty for a certain period of time. In the opposite condition the interval can be increased.

The interval can be increased when congestion mode is operating and/or the transmission scheme is backing off. In the opposite conditions the interval can be increased.

Altering the timer interval can most conveniently be done by altering the initial value for the timer that is stored in memory 41. The new value will be applied to the timer when it is next reset. However, it could also be advantageous to alter the current value of the timer's counter. The latter method is useful where the interval over which the timer operates is being reduced from a high value to a significantly lower value.

The entity that applies the algorithm to cause the timer interval to be altered could be the NIC, the operating system, the transport library or the application, or another entity. It is preferred that it is applied by the transport library since it can communicate directly with the NIC.

The timers on the NIC run outside the scope of scheduling by the main CPU 34 on the device 30, and outside the scope of scheduling by the operating system of the device 30. As a result they can be expected to run continually independently of the load or processing demands on the device 30.

The event that is triggered by the expiry of the timer could be a compound event in which the operating system is triggered to perform a number of functions. For example, the entity that executes the algorithm could be arranged to detect that multiple links are using timers that are set to the same value, and in response to that to group those links so as to use a single timer that triggers protocol processing for all those links using a single interrupt. This saves on interrupts.

The entity that is to perform protocol processing on being triggered by the timer is preferably arranged so that when it is triggered it checks whether protocol processing is already being performed on received data for the respective link, and if it is to not perform protocol processing in response to the trigger. It may conveniently detect whether protocol processing is being performed by the presence of a flag that any device performing protocol processing on the system is arranged to sent and unset.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features disclosed in this application or any application to which priority is claimed. In view of the foregoing description it will be evident to a person skilled in the art that various modifications may be made within the scope of the invention.

The invention claimed is:

1. A method for controlling the processing of data in a data processor, the data processor being connectable to a further device over a data link, the method comprising the steps of:
   receiving data at an element of the data processor;
   if a set interval has elapsed following the receipt of the data, determining whether processing of the received data in accordance with a data transfer protocol has begun, and, if it has not, triggering such processing of the received data by a protocol processing element;
   wherein a buffer space having a size is allocated to the data link for storing data received at the data processor over the data link, the data link having a protocol that employs a receive window in accordance with which a transmitter of data according to the protocol will transmit no further traffic data once an amount of data defined by the receive window has been transmitted and is unacknowledged by the data processor such that a size of the receive window is modified to a new size during operation;
   sensing the size of the buffer space allocated to the data link relative to the new size of the receive window; and setting the interval in dependence on the sensed size of the buffer space allocated to the data link relative to the new size of the receive window.

2. A method according to claim 1 wherein the data processor is connectable to the data link by means of an interface.

3. A method according to claim 2 wherein a timer resides on the interface, and said interval is measured by the timer.

4. A method according to claim 2 further comprising the step of in response to receiving the data, sending an instruction from the said element to the timer.

5. A method according to claim 4 wherein the step of sending an instruction to the timer comprises triggering the timer directly from said element via a memory mapping onto said interface.

6. A method according to claim 1 wherein the step of determining comprises determining whether processing of the received data by code at user level has begun.

7. A method according to claim 1 wherein said protocol processing element is an operating system.

8. A method according to claim 1 wherein the received data comprises data received at the data processor by means of an asynchronous transmission over the data link.

9. A method according to claim 1 wherein the received data comprises data to be transmitted by means of an asynchronous transmission over the data link.

10. A method according to claim 1 wherein the step of triggering processing comprises issuing an interrupt.

11. A method according to claim 10 wherein the step of triggering processing comprises issuing an interrupt to an operating system of the data processor.

12. A method according to claim 1 wherein the step of setting the interval comprises reducing the interval if the buffer space allocated to the data link relative to the new size of the receive window is indicative of an increase in data rate over the data link.

13. A method according to claim 1, wherein the step of setting the interval comprises reducing the interval in response to sensing that the size of the buffer space allocated to the data link is greater than the new size of the receive window.

14. A method according to claim 1, further comprising a step of varying the size of the buffer space allocated to the data link in response to a request from a consumer of the traffic data.

15. A method according to claim 14 wherein the consumer is an application running on the data processor.

16. A method according to claim 1 wherein the step of sensing conditions comprises sensing the presence in a transmit buffer of data to be transmitted over the data link.

17. A method according to claim 16 wherein the step of setting the interval comprises reducing the interval in response to sensing in a transmit buffer data to be transmitted over the data link.

18. A method according to claim 1 wherein the step of setting the interval comprises reducing the interval in response to sensing that a congestion mode of the protocol is in operation over the data link.

19. A memory storing non-transitory machine readable code, the machine readable code executable by a data processor and configured to control processing of data in the data processor, the data processor being connectable to a further device over a data link, the machine readable code comprising:

an element arranged to receive data; and a control entity arranged to, if a set interval has elapsed following the receipt of data, determine, using the data processor, whether processing of the received data in accordance with a data transfer protocol has begun, and, if it has not, trigger such processing of the received data by a protocol processing element;

wherein a buffer space having a size is allocated to the data link for storing data received at the data processor over the data link, the data link having a protocol that employs a receive window, the receive window having a size that is modified to a new size during operation, in accordance with which a transmitter of data according to the protocol will transmit no further traffic data once an amount of data defined by the receive window has been transmitted and is unacknowledged by the data processor; and wherein the control entity is further arranged to sense the size of the buffer space allocated to the data link relative to the new size of the receive window and set the interval in dependence on the sensed size of the buffer space allocated to the data link relative to the new size of the receive window.

20. A memory storing machine readable code in a non-transitory state for use with a data processor, the data processor being connectable to a further device over a data link, and machine readable code comprising an element arranged to receive data and a control entity arranged to:

if a set interval has elapsed following the receipt of data by said element, determine, using the data processor, whether processing of the received data in accordance with a data transfer protocol has begun, and, if it has not, trigger such processing of the received data by a protocol processing element;

wherein a buffer space having a size is allocated to the data link for storing data received at the data processor over the data link, the data link having a protocol that employs a receive window in accordance with which a transmitter of data according to the protocol will transmit no further traffic data once an amount of data defined by the receive window has been transmitted and is unacknowledged by the data processor, such that a size of the receive window is modified to a new size during operation; and wherein said control entity is further arranged to sense the size of the buffer space allocated to the data link relative to the new size of the receive window and set the interval in dependence on the sensed size of the buffer space allocated to the data link relative to the new size of the receive window.

* * * * *